US008091185B2

(12) United States Patent
Peng

(10) Patent No.: US 8,091,185 B2
(45) Date of Patent: Jan. 10, 2012

(54) APPARATUS FOR RESTRAINING A SQUEEZED CRD BLADE

(75) Inventor: Cheng-Chiou Peng, Taoyuan County (TW)

(73) Assignee: Atomic Energy Council-Institute of Nuclear Energy Research, Lungtan, Taoyuan (TW)

( * ) Notice: Subject to any disclaimer, the term of this patent is extended or adjusted under 35 U.S.C. 154(b) by 76 days.

(21) Appl. No.: 12/637,964

(22) Filed: Dec. 15, 2009

(65) Prior Publication Data

US 2011/0139020 A1 Jun. 16, 2011

(51) Int. Cl.
*A44B 99/00* (2010.01)
*B23Q 3/00* (2006.01)

(52) U.S. Cl. ........................... 24/335; 100/102; 269/287

(58) Field of Classification Search .................. 100/102; 24/326, 329, 335; 269/1, 46, 287, 288, 900
See application file for complete search history.

(56) References Cited

U.S. PATENT DOCUMENTS 603,663 A * 5/1898 Spielman ........................ 24/299
4,563,631 A * 1/1986 Mashino et al. ................ 322/33

* cited by examiner

*Primary Examiner* — Jimmy T Nguyen
(74) *Attorney, Agent, or Firm* — Jackson IPG PLLC; Demian K. Jackson

(57) ABSTRACT

A restraining apparatus for restraining a squeezed CRD blade includes two clips, two connective plates and a nut. The clips are made with a U-shaped cross-sectional configuration. The connective plates are used to connect the clips to each other so that the connective plate and the clips together form an annular structure for restraining the CRD blade. The nut is provided between the connective plate and can be engaged with a threaded section of an operative rod so that the operative rod is operable to move the restraining apparatus.

3 Claims, 8 Drawing Sheets

APPARATUS FOR RESTRAINING A SQUEEZED CRD BLADE

BACKGROUND OF INVENTION

1. Field of Invention

The present invention relates to an apparatus for restraining a squeezed CRD blade.

2. Related Prior Art

Referring to FIGS. 7 and 8, there is shown a CRD blade 5 for use in a nuclear power plant. Normally, the CRD blade 5 is made with a cruciform cross-sectional shape. The CRD blade 5 is about 4 meters long, and the volume thereof is huge. After use, the CRD blade 5 contains a considerable radiation dose. Therefore, the CRD blade 5 is stored in a spent fuel pool to prevent the radiation dose thereof from contaminating the environment. The CRD blade 5 however occupies precious space in the spent fuel pool. To reduce the space for storing the CRD blade 5, the CRD blade 5 is squeezed so that the cross-sectional shape is changed to H-shaped from cruciform. The squeezing of the CRD blade 5 is conducted at least 2 meters below the water surface.

There is shown a conventional squeezing machine 4 for squeezing the CRD blade 5. The squeezing machine 4 includes a squeezing cylinder, a squeezing plate 41 connected to the squeezing cylinder and a template 42. The squeezing cylinder can be a hydraulic or pneumatic cylinder. The CRD blade 5 is located between the squeezing plate 41 and the template 42. The squeezing cylinder is actuated to move the squeezing plate 41 towards the template 42, thus squeezing the CRD blade 5. Now, the CRD blade 5 can be stored in the spent fuel pool and occupy small space. The CRD blade 5 might recover from the squeezed status because it is made of steel that is resilient to some extent. Should the CRD blade 5 recover, it would occupy large space.

The present invention is therefore intended to obviate or at least alleviate the problems encountered in prior art.

SUMMARY OF INVENTION

It is an objective of the present invention to provide a machine for squeezing a cruciform element.

To achieve the foregoing objective, the squeezing machine includes a box-shaped chamber, a template and a squeezing cylinder. The box-shaped chamber includes a supportive plate, a template and two walls. The template is located opposite to the supportive plate, and includes two ribs for contacting two robes of the cruciform element, and two walls for connecting the template to the supportive plate so that the supportive plate, the template and the walls together define a space for receiving the cruciform. The template is movably located in the box-shaped chamber, and includes two ribs for contact with the other lobes of the cruciform element. The squeezing cylinder is attached to the supportive plate, and includes a piston movably disposed therein and a piston rod formed with an end connected to the piston and another end connected to the squeezing plate.

It is another objective of the present invention to provide an apparatus for restraining a cruciform element after the cruciform element is squeezed.

To achieve the foregoing objective, the restraining apparatus includes two clips, two connective plates and a nut. The clips are made with a U-shaped cross-sectional configuration. The connective plates are used to connect the clips to each other so that the connective plate and the clips together form an annular structure for restraining the CRD blade. The nut is provided between the connective plate and can be engaged with a threaded section of an operative rod so that the operative rod is operable to move the squeezing apparatus.

Other objectives, advantages and features of the present invention will become apparent from the following description referring to the attached drawings.

BRIEF DESCRIPTION OF DRAWINGS

The present invention will be described via detailed illustration of the preferred embodiment referring to the drawings.

DETAILED DESCRIPTION OF EMBODIMENTS

Figure 1:
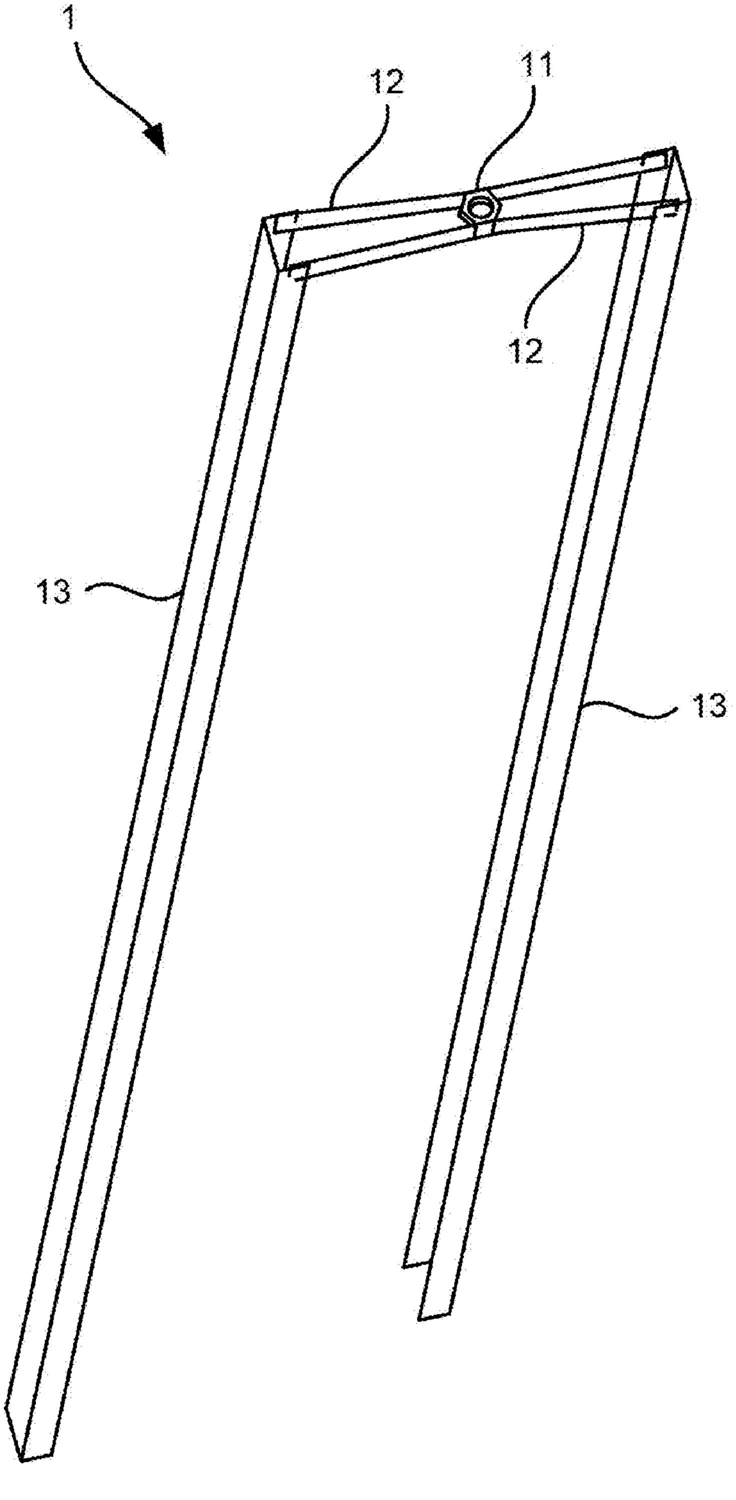
FIG. 1 is a perspective view of an apparatus for restraining a CRD blade after being squeezed according to an embodiment of the present invention.

Referring to FIG. 1, there is shown an apparatus 1 for restraining a CRD blade 3 (FIG. 2) in a squeezed status according to an embodiment of the present invention. The restraining apparatus 1 includes two clips 13, two connective plate 12 for connecting the clips 13 to each other and a nut 11 provided between the connective plate 12 near an upper end thereof. The clips 13 are made of steel for strength. The clips 13 are made with a U-shaped cross-sectional configuration so that each thereof can clip two lobes of the CRD blade 3. The clips 13 can be made with different lengths.

The connective plate 12 are made of steel. The connective plate 12 are connected to the clips 13 by welding so that the connective plate 12 and the clips 13 together form an annular structure for restraining the CRD blade 3.

The nut 11 is attached to the connective plate 12 by welding. The nut 11 can be engaged with a threaded section of an operative rod so that the CRD blade 3 restrained with the restraining apparatus 1 can be lowered to eight meters below the water surface in a spent fuel pool with the operative rod.

Figure 2:
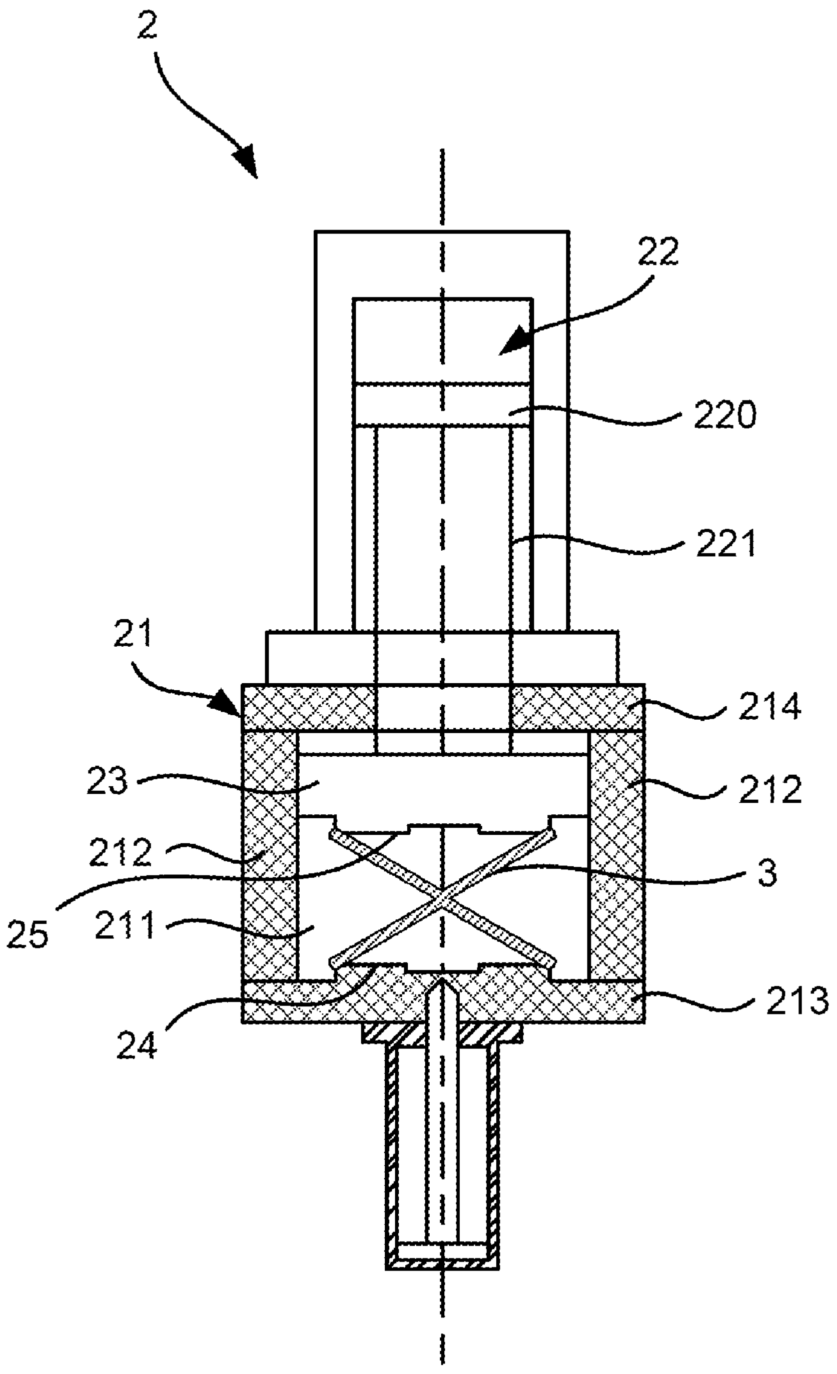
FIG. 2 is a cross-sectional view of the CRD blade to be squeezed with a squeezing machine according to another embodiment of the present invention.

Referring to FIG. 2, there is shown a machine 2 for squeezing the CRD blade 3. The machine 2 includes a box-shaped chamber 21 for receiving the CRD blade 3 and a squeezing cylinder 22 for driving a squeezing plate 23 to squeeze the CRD blade 3 against the box-shaped chamber 21. The box-shaped chamber 21 includes a supportive plate 214 for supporting the cylinder 22, a template 213 opposite to the supportive plate 214 and two walls 212 for connecting the template 213 to the supportive plate 214. The template 213 is formed with two ribs 24 for contact with two lobes of the CRD blade 3. A space 211 is defined by the walls 212, the template 213 and the supportive plate 214.

The cylinder 22 includes a piston 220 and a piston rod 221. The piston 220 is movable in the cylinder 22. The piston rod 221 is made with a first end connected to the piston 220 and a second end connected to the squeezing plate 23. The cylinder 22 is attached to the supportive plate 214.

The squeezing plate 23 is formed with two ribs 25 for contact with the other lobes of the CRD blade 3. The ribs 25 are shaped and located corresponding to the ribs 24.

Figure 3:
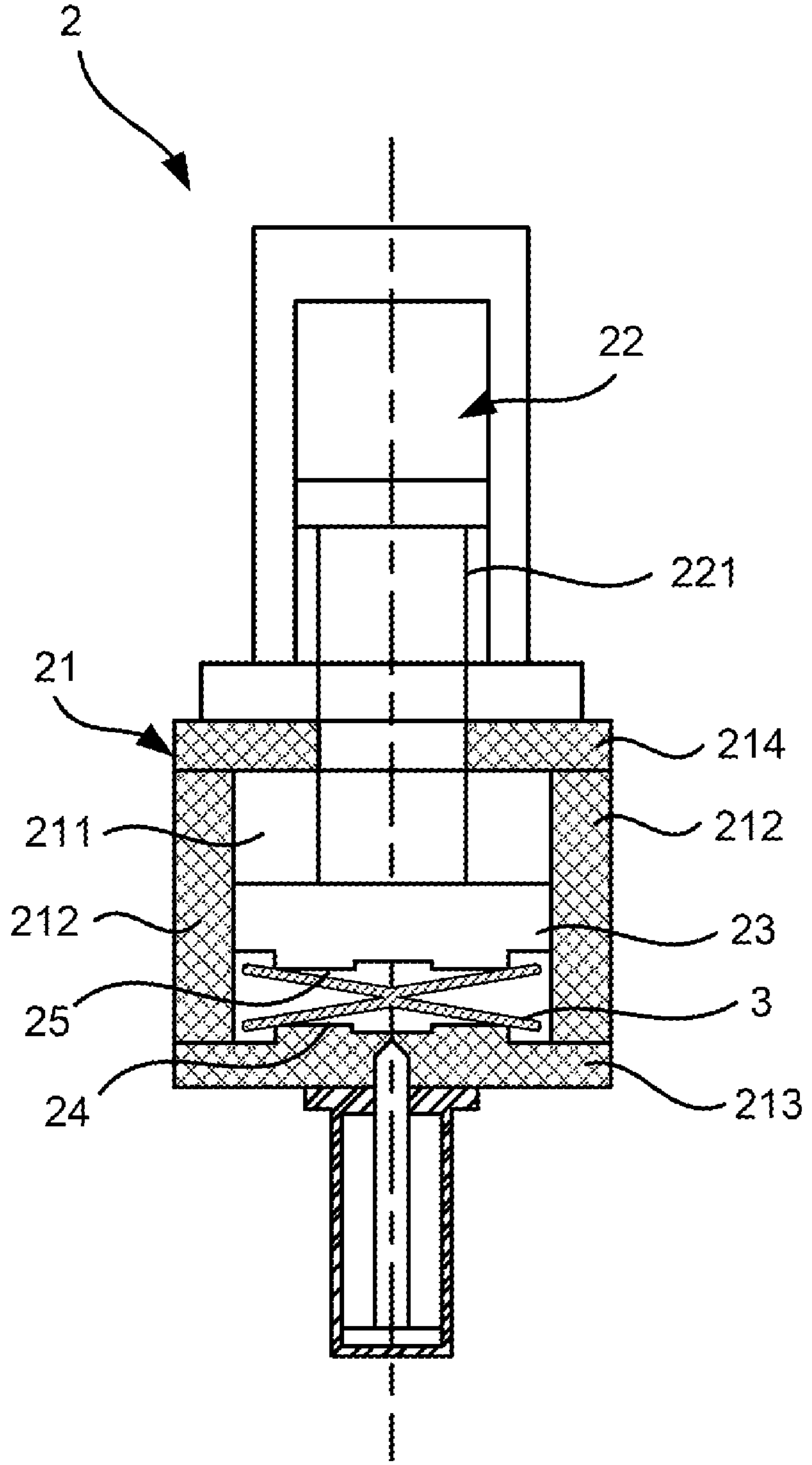
FIG. 3 is a cross-sectional view of the CRD blade during a squeezing operation by the squeezing machine shown in FIG. 2.
Figure 4:
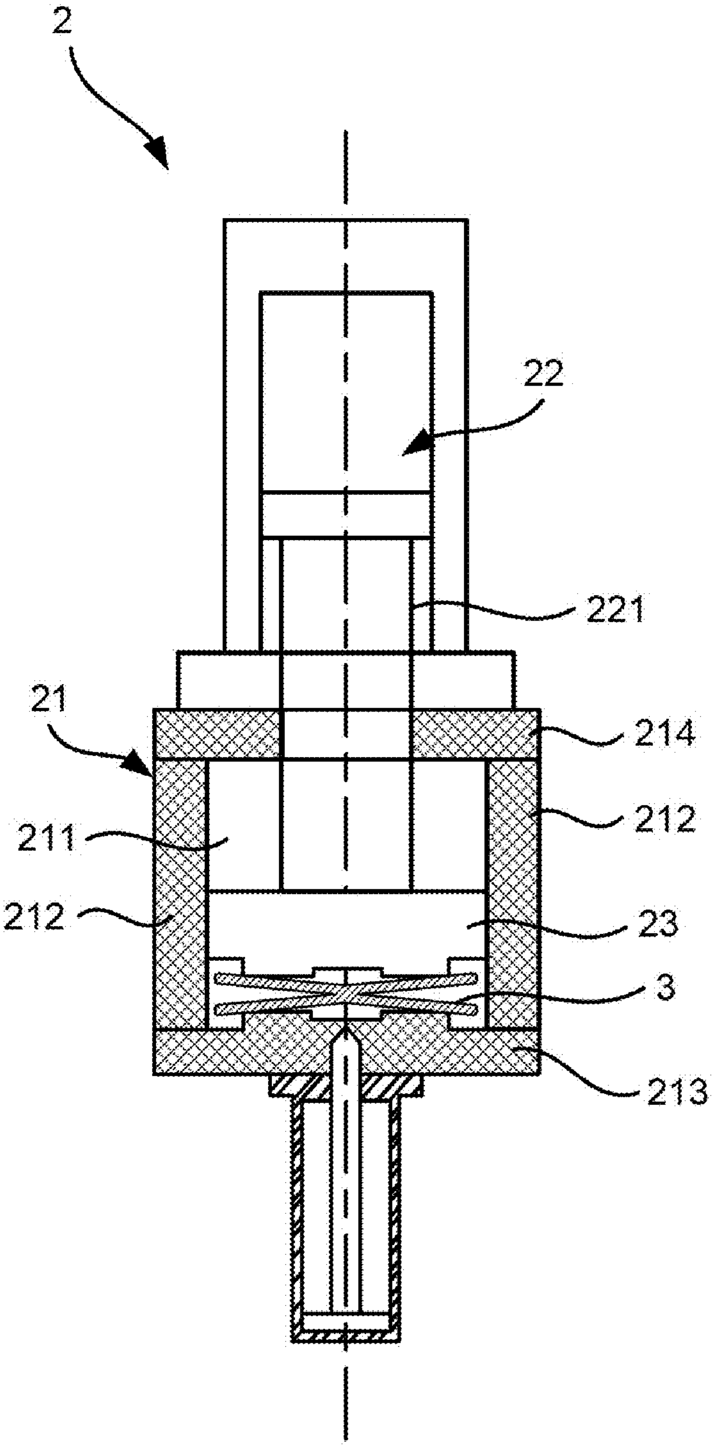
FIG. 4 is a cross-sectional view of the CRD blade after the squeezing operation by the squeezing machine shown in FIG. 2.

Referring to FIGS. 2 through 4, the CRD blade 3 is inserted through the box-shaped chamber 21. The lobes of the CRD blade 3 are in contact with the ribs 23 and 25. The squeezing cylinder 22 is actuated to move the piston 220 and therefore extend the piston rod 221 from the squeezing cylinder 22. Accordingly, the squeezing plate 23 is moved towards the template 213, thus squeezing the CRD blade 3. The squeezing machine 2 is located eight meters below the water surface to execute the squeezing operation while preventing radiation dose of the CRD blade from contaminating the environment.

Figure 5:
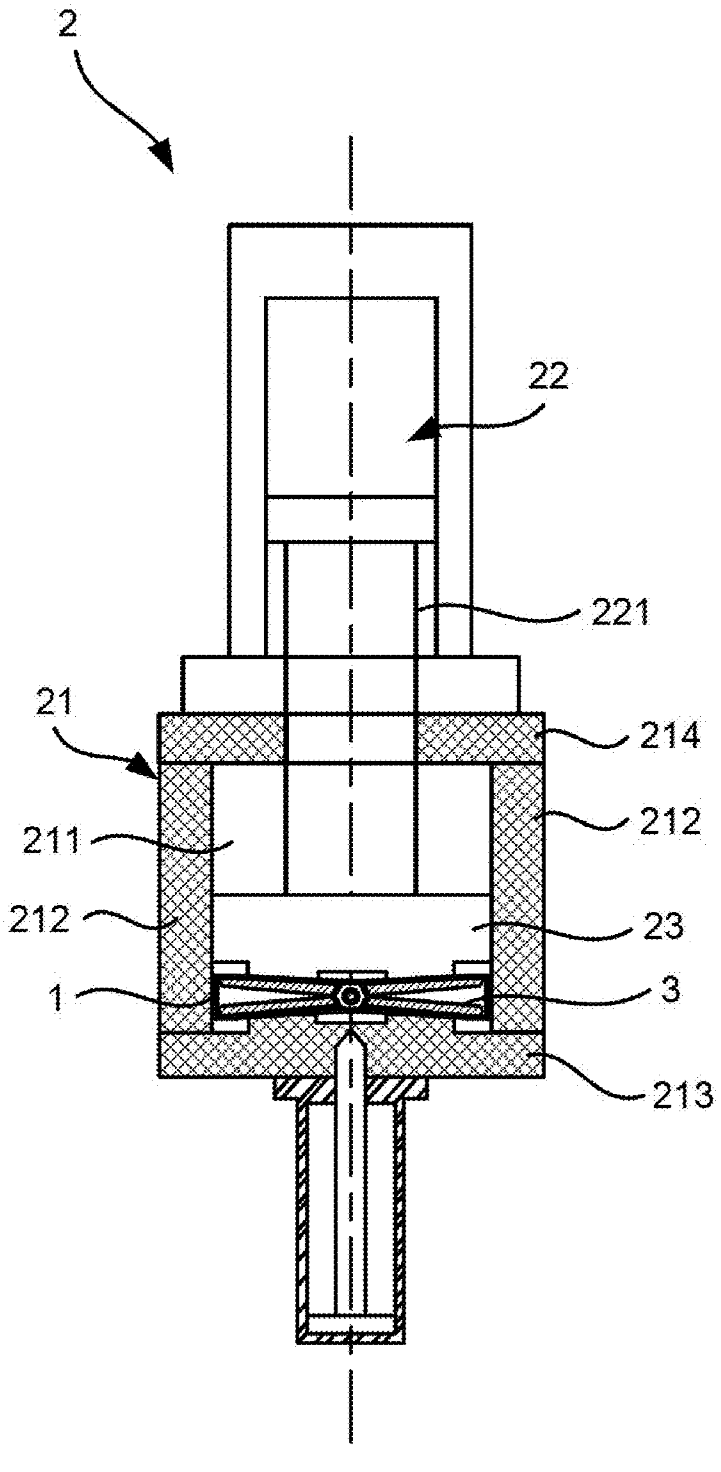
FIG. 5 is a cross-sectional view of the CRD blade restrained in the squeezed status with the apparatus shown in FIG. 1.
Figure 6:
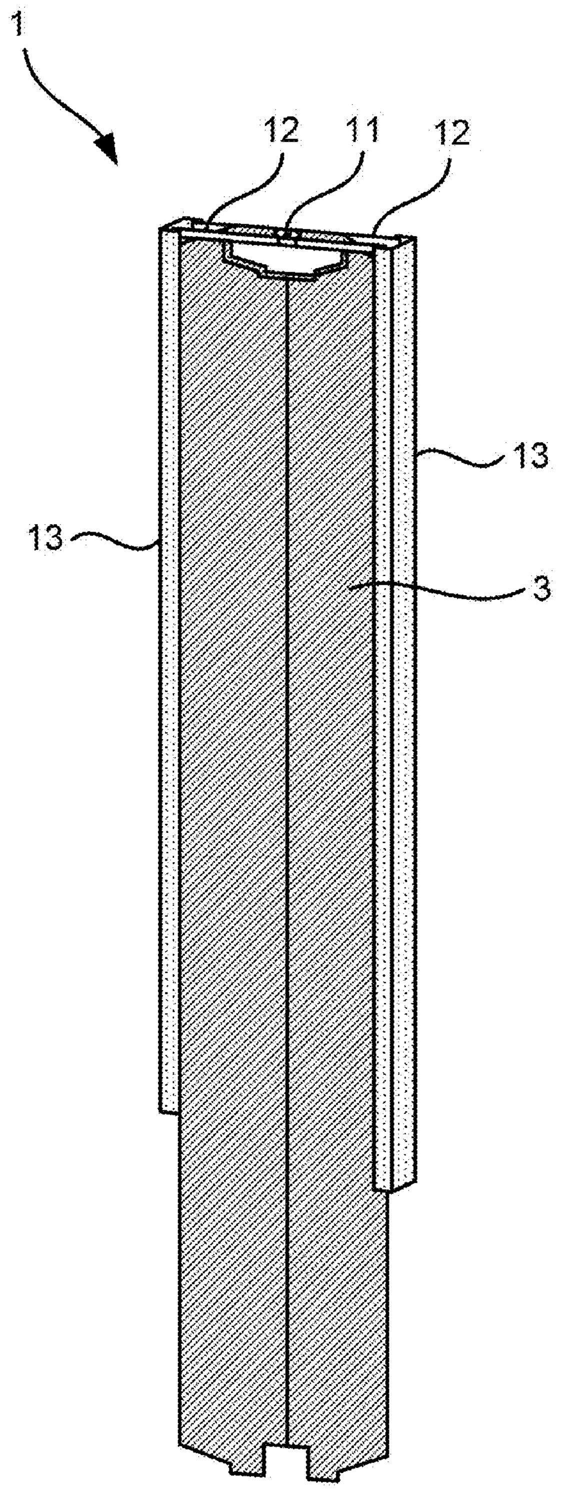
FIG. 6 is a perspective view of the CRD blade restrained in the squeezed status with the apparatus shown in FIG. 1.
Figure 7:
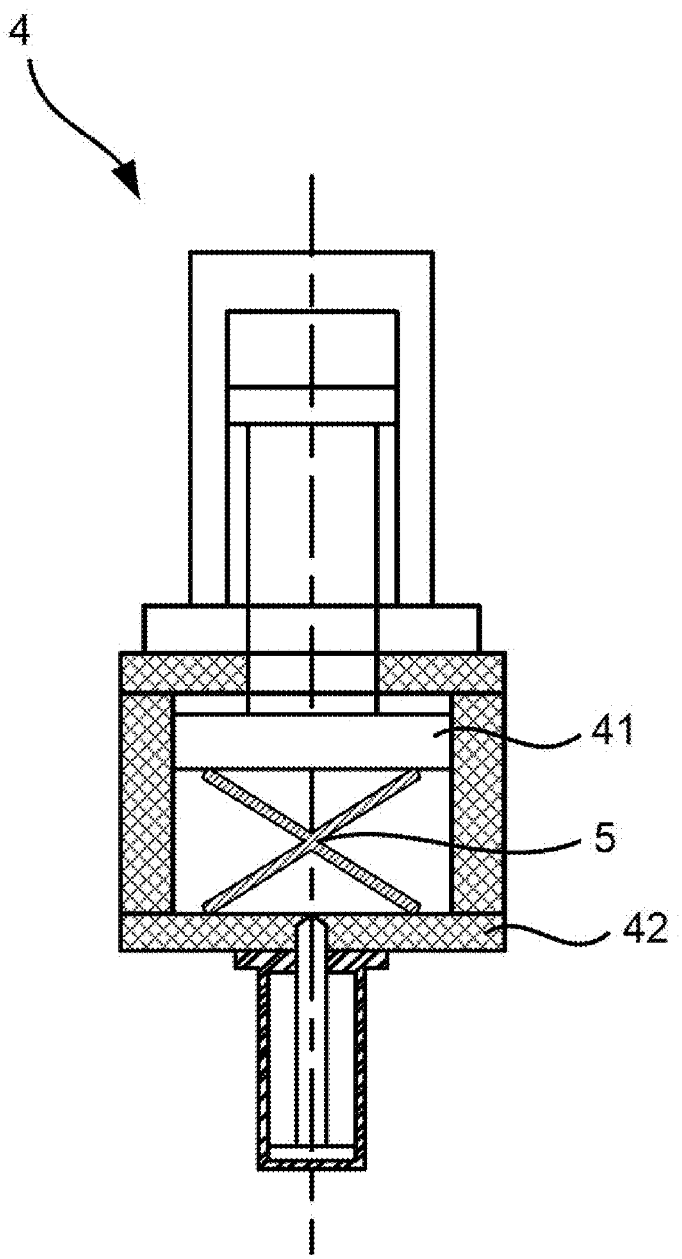
FIG. 7 (Prior Art)
FIG. 7 is a cross-sectional view of a CRD blade to be squeezed with a conventional squeezing machine.
Figure 8:
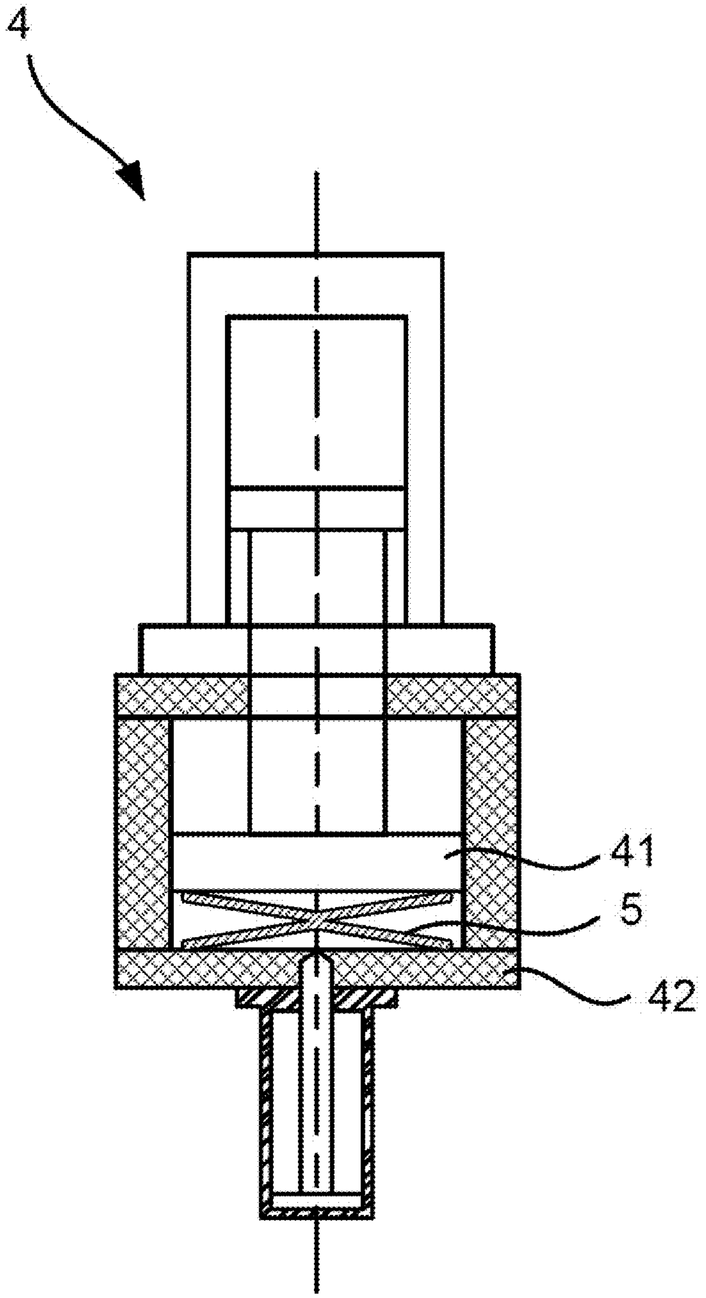
FIG. 8 (Prior Art)
FIG. 8 is a cross-sectional view of the CRD blade after being squeezed with the conventional squeezing machine shown in FIG. 7.

Referring to FIG. 5, with the help of the operative rod, the restraining apparatus 2 is lowered and provided around the CRD blade 3 that has been squeezed with the squeezing machine 2. Referring to FIG. 6, the CRD blade 3 is restrained in the squeezed status with the restraining apparatus 1. Then, the operative rod can be disengaged from the nut 11, leaving the CRD blade 3 within the spent fuel pool.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. An apparatus for restraining a cruciform element after the cruciform element is squeezed, the restraining apparatus comprising:

two clips with a U-shaped cross-sectional configuration each of the clips is configured to clip two lobes of a CRD blade;

two connective plates for connecting the clips to each other so that the connective plates and the clips together form an annular structure for restraining the CRD blade; and a nut provided between the connective plates for engagement with a threaded section of an operative rod so that the operative rod is operable to move the restraining apparatus.

2. The restraining apparatus according to claim 1, wherein the connective plates are made of steel.

3. The restraining apparatus according to claim 1, wherein, each of the clips having different lengths.

* * * * *